The United States of America

TO ALL TO WHOM THESE Letters Patent SHALL COME:

Whereas *Enoch Walker a Citizen of* the United States hath alleged that he has invented a new and useful improvement

*in the Fanning Mill* which improvement he states has not been known or used before his application: hath *affirmed* that he does verily believe that he is the true inventor or discoverer of the said improvement; hath paid into the treasury of the United States the sum of thirty dollars, delivered a receipt for the same, and presented a petition to the Secretary of State, signifying a desire of obtaining an exclusive property in the said improvement, and praying that a patent may be granted for that purpose. These are therefore to grant, according to law, to the said *Enoch Walker* his heirs, administrators or assigns, for the term of fourteen years, from the *twentieth* day of *September* one thousand eight hundred and *twenty seven* the full and exclusive right and liberty of making, constructing, using and vending to others to be used, the said improvement; a description whereof is given in the words of the said *Enoch Walker* himself, in the schedule hereto annexed, and is made a part of these presents.

In Testimony whereof, I have caused these Letters to be made Patent, and the Seal of the United States to be hereunto affixed.

GIVEN under my hand, at the City of Washington, this *twentieth* day of *September* in the year of our Lord one thousand eight hundred and *twenty seven* and of the independence of the United States of America the *fifty second*

J. Q. Adams.

BY THE PRESIDENT.

*H Clay* Secretary of State.

*City of Washington*, TO WIT:

I DO HEREBY CERTIFY, That the foregoing Letters Patent were delivered to me on the *twentieth* day of *September* in the year of our Lord one thousand eight hundred and *twenty seven* to be examined; that I have examined the same, and find them conformable to law; and I do hereby return the same to the Secretary of State, within fifteen days from the date aforesaid, to wit; on this *twentieth* day of *September* in the year aforesaid.

*Wm Wirt* Attorney General of the United States.

W.I.Stone, Sc. Wash.n

The Schedule referred to in these Letters Patent & making part of the same, containing a description in the words of the said Enoch Walker, himself, of his improvement in the Fanning Mill, –

---

Each side of Mill is made by nailing or screwing two boards about 24 inches wide cross-ways, the upright one about four feet high, its lower end resting on the floor, and the horizontal one about 4½ feet long, its upper edge about five inches from the top of the upright one – one end extending over the edge of the upright board, about a foot, to be rounded or angled for fan cover, to extend round the outside, under & upwards, and down inner side as low as the cog-shaft, to bring the wind to a focus to act where it should, let the fan turn which way it may; – secure those sides of the mill in their places (with the fan shaft about thirty one inches from the floor & the cogshaft through the body of the mill about 36 inches, also from the floor, & in his mills of common size & form about 16 inches from the fan shaft,) by nailing or screwing four boards rabbeted to the edges of the upright boards, the two upper ones about five inches wide, and the two lower ones about ten inches wide and each of them about two feet long, according to the width of the mill. – In the middle of said shaft passing through the body of the mill there are about four cogs or points to to shake the whole bottom of the hopper like an inclined plane placed in
a long mortice over the wings where preferred; to cast the grain through teeth
like a fork on any part of the sieves preferred;— or make the whole hopper
like a bolting shoe of a grist mill with the teeth attached to its lower
end to shake up the straw & chaff over & through the wind whilst
the grain falls about six inches, or more on & through the sieves; their
width — the outlet of the hopper & screen board to convey away the grain,
are as wide or nearly as the mill, working up and down and end ways by
motion of said cogs or otherwise— The wire of the sieves is nailed
to the lower edges of side boards and strips for their inner and outer ends.
The middle of their inner ends are attached where best to a perpendicular
spring from said cogs down through the middle of the screen or
shoot board; into the middle of a strong bolt through the mill near
the floor, with a spring lever in its outer end with a catch to hold
the top of the spring, (to which the sieves are attached) to said cogs
and give a free motion to the sieves & screen board, all suspended
with about three straps of about twenty inches long; two of them
just inner side of tail end of mill, with holes in their lower ends for
points in the outer ends of the sides of the sieves, and upper end of screen
board to hook in at any angle to work free without any obstruction
above the sieves as common mills to the straw and chaff passing freely away.
The The lower end of the middle of the screen board (which has strips on its edges to
prevent the grain falling over the sides, is suspended with one strap as aforesaid
attach'd to the fan cover above, or any other way prefered — Work the mill
with friction wheels (or cog or band wheels as common) with a handle near
the edge of the large one, on the end of said cog shaft, the man turning
standing by the side of the hopper to regulate the feed without another person — place
a bolt longer than the mill is wide near the lower outer corners of said
horizontal or cross boards to secure the tail board higher or lower at
any angle by keeping the tail ends of the cross boards in their places to the
ends of said tail board, by a screw or key to the end of said bolt — — —

These improvements may be applied in part or altogether to
the old common fanning mills, threshing and stone mills or any other
that will answer.

Place boards or leather the inner sides of the mill above the edges of
the sides of the sieves to prevent grain &c falling there out sides, and if
no hopper like a bolting as aforesaid, nail strips of leather or cloth the
inner sides of the hopper being the upper ends of the upright boards as aforesaid
to prevent grain &c passing through where the edges of the bottom of the hopper
or inclined plane works — Clamp and secure pieces to the lower ends of
said uprights boards, to make a longer bearing on the floor & strengthening
the mill.

In applying said improvements to the common windmills remove their hoppers roppers cleets &c. within, including the common shoe, and place the cog shaft to work as aforesaid, as close to the common wings as will answer, & about seven inches lower than level with the top of the wings over which place the bottom of the hopper as aforesaid, with the sieves & screen board as wide or nearly as the mill to work as aforesaid or any other way prefered with the outlet of the hopper as wide or nearly as the mill.—

Witnesses
David Post
George Walker

Enoch Walker